United States Patent [19]

Bothe et al.

[11] Patent Number: 5,645,919

[45] Date of Patent: Jul. 8, 1997

[54] SELF-SUPPORTING SHEET-LIKE STRUCTURE HAVING AT LEAST ONE STRUCTURED SURFACE

[75] Inventors: Lothar Bothe, Mainz; Hermann Dallmann, Wiesbaden; Peter Dinter, Oestrich-Winkel; John Derek Gribbin, Schlangenbad, all of Germany

[73] Assignee: Hoechst Aktiengesellschaft Corporation, Germany

[21] Appl. No.: 499,873

[22] Filed: Jul. 10, 1995

Related U.S. Application Data

[63] Continuation of Ser. No. 847,878, Mar. 10, 1992, abandoned, which is a continuation of Ser. No. 390,932, Aug. 8, 1989, abandoned.

[30] Foreign Application Priority Data

Aug. 16, 1988 [DE] Germany ................. 38 27 631.3

[51] Int. Cl.$^6$ ................. B32B 5/16; B05D 3/14; B05D 7/02; B29C 71/04
[52] U.S. Cl. ............... 428/143; 204/164; 204/165; 204/170; 264/453; 427/477; 427/563; 427/569; 427/579; 428/161; 428/144; 428/145; 428/147; 428/149; 428/332; 428/340; 428/341; 428/409; 428/480; 428/500
[58] Field of Search .................... 204/164, 165, 204/170; 264/22; 427/180, 184, 201, 475, 477, 562, 563, 569, 574, 578, 579; 428/141, 143, 144, 145, 147, 149, 332, 340, 341, 409, 480, 483, 500

[56] References Cited

U.S. PATENT DOCUMENTS

| | | | |
|---|---|---|---|
| 2,043,906 | 6/1936 | Sheppard et al. | 428/147 |
| 4,568,616 | 2/1986 | Seifried et al. | 428/480 |
| 4,695,503 | 9/1987 | Liu et al. | 428/207 |
| 4,816,333 | 3/1989 | Lange et al. | 428/331 |
| 4,833,017 | 5/1989 | Benoit | 428/323 |

FOREIGN PATENT DOCUMENTS

| | | |
|---|---|---|
| 101080 | 8/1983 | European Pat. Off. . |
| 125482 | 4/1984 | European Pat. Off. . |
| 153853 | 2/1985 | European Pat. Off. . |
| A279371 | 2/1988 | European Pat. Off. . |
| 1494151 | 7/1969 | Germany . |
| 2501123 | 7/1976 | Germany . |
| 3705482 | 9/1988 | Germany . |

OTHER PUBLICATIONS

Ullmanns Encyklopadie der technischen Chemie, Dr. Peter Josef Schmitz, Verlag Chemie, Weinheim/Bergstr., pp. 673–685.

Encyclopedia Of Polymer Science And Engineering, vol. 7, Films, John Wiley & Sons, pp. 73–125, 1987.

Primary Examiner—Dhirajlal Nakarani
Attorney, Agent, or Firm—G. N. Clements

[57] ABSTRACT

A self-supporting sheet-like structure is described, which contains a substrate layer and a structured coating on at least one surface of the substrate layer. The structured coating is produced by treating at least one surface of the substrate layer by means of an electric corona discharge, which takes place between a high voltage electrode and a grounded counter-electrode. In this procedure, an aerosol containing discrete inert particles is simultaneously introduced into the corona discharge space during the corona discharge to improve the slip characteristics and reduce friction of the substrate layer.

13 Claims, 4 Drawing Sheets

SELF-SUPPORTING SHEET-LIKE STRUCTURE HAVING AT LEAST ONE STRUCTURED SURFACE

This is a continuation of application Ser. No. 07/847,878 filed on Mar. 10, 1992, now abandoned, which is a continuation of application Ser. No. 07/390,932 filed Aug. 8, 1989, now abandoned.

BACKGROUND OF THE INVENTION

1) Field of the Invention

The present invention relates to a self-supporting sheet-like structure containing a substrate layer and a structured coating on at least one surface of the substrate layer. The coating composition includes inert particles.

The invention furthermore relates to a process for the production of a sheet-like structure according to the invention, having a structured coating and a firmly adhering and abrasion-resistant structured coating on a polymer substrate. The coating being applied as an aerosol simultaneously with a corona treatment to the substrate layer.

2) Prior Art

In the case of sheet-like moldings of polymeric materials, such as films or sheets, inadequate slip and frictional properties during production and further processing of the materials lead to many undesirable problems. Static friction and sliding friction and blocking against one another and against guide or direction-changing elements, such as, for example, rollers, are examples of some of the undesirable problems.

A conventional suitable solution for solving this problem consists of incorporating in the material of the substrate layer inert particles which lead to a certain surface structure and thus have an advantageous effect on the sliding behavior of the molding. Examples of such inert particles, which can be incorporated either during the preparation of the thermoplastic or via a masterbatch during production of the molding, are inorganic natural or synthetic compounds, such as $BaSO_4$, $CaCO_3$, $TiO_2$, $SiO_2$, kaolin, Ca phosphates, etc., or organic particles, for example those consisting of crosslinked acrylates. The concentrations vary within wide limits, i.e., in the range from 0.001 to 1.0 percent by weight.

As already mentioned, a substantial improvement in the sliding properties of the moldings can be achieved by this solution, which also has an advantageous effect on the performance characteristics of the articles produced therefrom.

However, the disadvantage here is that the inert particles, before incorporation, have to be subjected to a very complicated, expensive treatment process for establishing the particle size distribution tailored to the particular surface roughness required and for incorporation into the matrix, in order to avoid other disadvantages, such as, for example, increased abrasion on contact with guide elements and the like. Furthermore, the optical properties of the substrates can also be adversely affected in some cases.

EP-A-O 153 853 describes a substrate film for a magnetic tape, the said film having a net-like coating which contains fine particles and is intended to impart the necessary frictional properties to the said substrate film. In this process, the coating materials, such as the colloidal silicates, have to be mixed with polymeric binders and the mixture applied to the surface of the substrate between the individual orientation steps. One of the disadvantages of this process is that the formation of the structures necessitates at least one stretching step, i.e., is linked with the process for the production of the film.

SUMMARY OF THE INVENTION

It is the object of the present invention to provide sheet-like structures, such as films, sheets and the like, which are easy to handle and have slip-promoting surfaces, where the slip-promoting substances and the structures resulting from these can be applied independently of the production process and are still firmly anchored to the substrate.

This object is achieved by a sheet-like structure of the type stated at the outset, whose defining feature is that the structured coating is produced by treating at least one surface of the substrate layer by means of an electric corona discharge which occurs between high voltage electrodes and a grounded counter-electrode, with an aerosol containing discrete inert particles simultaneously being introduced into the corona discharge space during the corona discharge.

DESCRIPTION OF THE PREFERRED EMBODIMENTS

Figure 1:
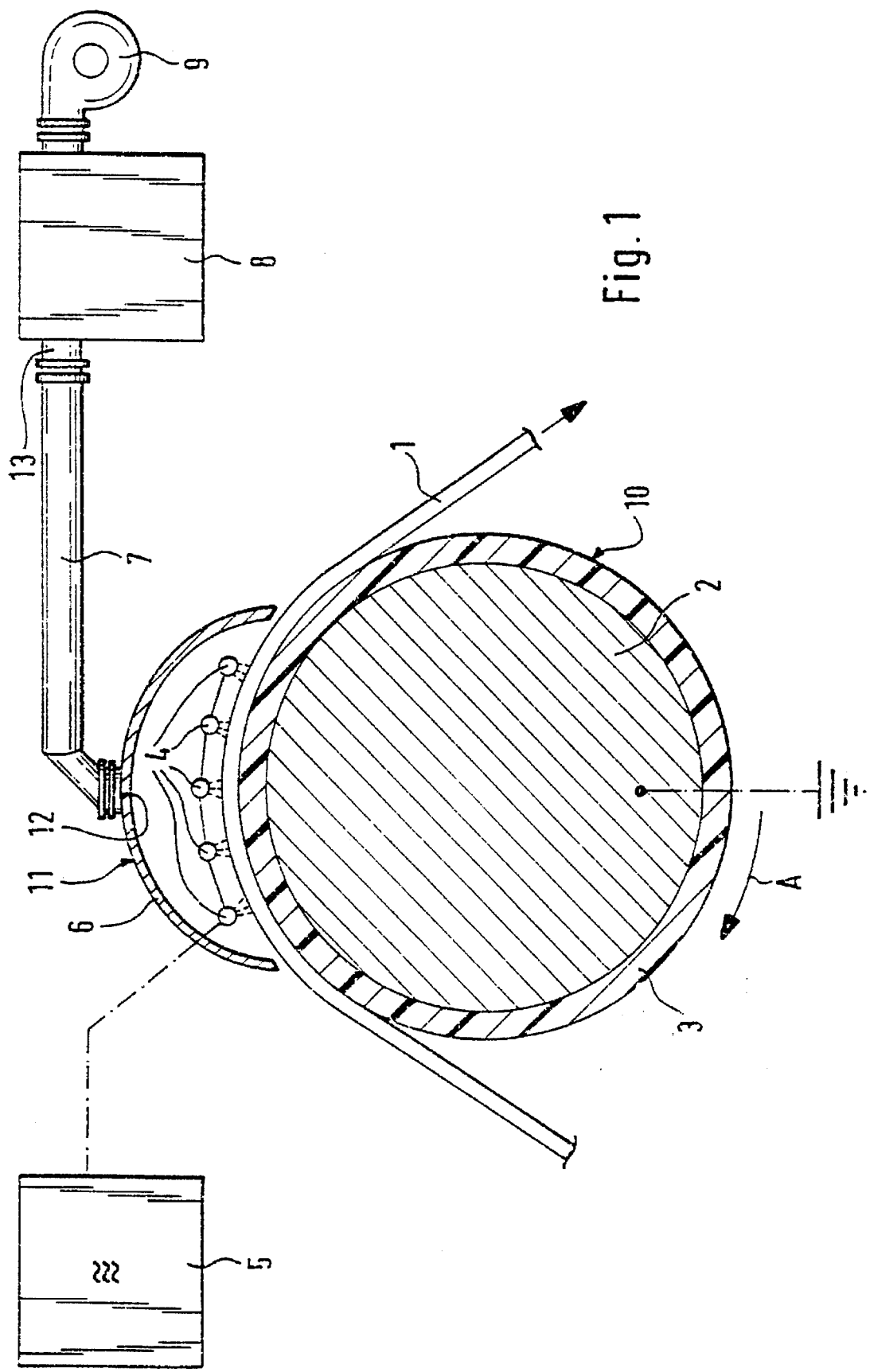
FIG. 1 of the drawing is a part schematic view, part cross-sectional view of the aerosol/corona treatment apparatus of the present invention.

For the purposes of the present invention, it is possible in principle to use for the substrate layer all materials which have the difficulties stated previously, i.e., inadequate slip properties and frictional properties during processing due to excessively smooth surfaces, in particular polymers, which can be in the form of flat, sheet-like structures, such as films or sheets.

Examples of such polymers are, in particular, polymer films of natural and synthetic polymers, such as cellulose, cellulose esters, polyvinyl chloride, polystyrene, styrene copolymers with butadiene, polycarbonate, polymers and copolymers of olefins, such as ethylene, propylene, butylene, methylpentene, etc., polysulfones, aliphatic and aromatic polyesters, polyimides, polyisobutylene, polymethyl methacrylate, polyphenylene sulfide, polyurethane, polyamide, polyaryl ether ketones, polyaryl ether ether ketones, polyaryl ether sulfones, polyamidoimide, polyetherimide, etc., including biaxially oriented polyester film or biaxially oriented polypropylene film, (cf. Ullmanns Encyclopadie der Technischen Chemie, Verlag Chemie, Weinheim, 4th revised and extended edition (1976), page 673 et seq.; Encyclopedia of Polymer Science and Eng., Vol. 7, John Wiley & Sons (1973), page 73 et seq.). The production of self-supporting, oriented or non-oriented films from the stated polymers is carried out by various known technologies, which are likewise described in the literature cited. The term self-supporting film is intended to be understood to include both monofilms consisting of one layer and multilayer films consisting of a plurality of layers of identical or different polymer materials, or layers of plastics containing laminates and of non-plastics, such as, for example, paper or metal.

The structured coating on the substrate layer is formed by the simultaneous action of an electric corona discharge in the presence of an aerosol containing discrete inert particles. The corona discharge triggers and promotes reaction mechanisms which result in chemical surface modification of the treated substrate. It is assumed that, as a result of the corona discharge, the aerosol or the agents contained therein is or are firmly anchored to the substrate surface.

For the corona discharge, an alternating current voltage between 5,000 and 25,000 V is applied to the high voltage electrodes by means of a high voltage generator. The alternating current voltage between the high voltage electrodes and the grounded counter-electrode should be proportional to the transport velocity at which the substrate to be treated moves through the corona discharge zone, i.e., at a higher transport velocity the alternating current voltage should be in the upper voltage range while at lower transport velocities a medium to low voltage in the range of 5,000 to 18,000 V can be set in order to achieve an effect of the same magnitude.

The aerosols can be produced with the aid of known two-material atomizing nozzles or preferably by means of piezoelectric ultrasonic atomizing systems. Aerosols can be produced using mixtures, preferably dispersions of inert particles of inorganic or organic compositions, which are in solvents or dispersants, preferably in water.

A process for the treatment of the surfaces of plastics substrates by means of corona discharge with simultaneous spraying with an aerosol, and an arrangement for carrying out this process, have been described in every detail in German Patent Application P 37 05 482.1, corresponding to U.S. Ser. No. 07/156,572, filed Feb. 17, 1988, now U.S. Pat. No. 4,929,319, assigned to the assignee of the present invention.

Examples of inert particles are inorganic particles such as finely divided silicas, Al oxides, Ti oxides or Zr oxides or colloidal solutions thereof, which may have different sizes and forms depending on their method of preparation. The monodisperse oxides obtained by hydrolysis of the reaction products of metal halides with organic compounds, such as, for example, in alcohols, or in water/ammonium solutions may have a spherical form and/or a narrow particle size distribution. They are thus particularly suitable for improving the sliding properties of high quality substrates, such as, for example, of substrate films for magnetic tapes. Further examples of inorganic particles are molybdenum sulfide and fluorides and salts, such as $CaF_2$, LiF, finely divided $CaCO_3$, etc.

Examples of organic inert particles are, inter alia, the small polymer spheres described in EP-A-O 101 080, the divinylbenzene-crosslinked acrylate particles described in EP-A-O 125 482 or the maleic anhydride copolymers described in DE-A-25 01 123.

In addition to the inert particles, the aerosol can also preferably contain a binder. The binders used can be low molecular weight or high molecular weight substances, for example gelatine, polyvinyl alcohols, cellulose derivatives such as carboxymethylcellulose, fine water-dispersible or water-soluble copolyesters or copolyester ethers, which may contain building blocks containing alkali metals such as the sodium salt of 5-sulfoisophthalic acid, in amounts of from 1 to 50 mol percent. Acrylate-containing copolymers, including those which are crosslinkable, for example with melamine, polyurethanes, polyolefins or ionomers which are dispersed in water, are also suitable binders. Through the choice of the low molecular weight or high molecular weight substances, it is possible to impart to the substrate not only the sliding properties desired according to the invention but also further valuable surface properties, such as improved adhesion to applied materials, sealability, etc.

The amount of binders and particles to be applied and the mixing ratio can be varied within wide limits and is preferably tailored to the particular relevant application.

In the process according to the invention, the structure-forming agents are first dispersed in a solvent or dispersant, with an aqueous solvent or dispersant preferably being used, and the dispersion together with a carrier gas stream is then sprayed into the corona discharge space as an aerosol. The dispersions generally have a solids content of from 0.5 to 20 percent by weight, based on the total weight of the dispersion. It may be advantageous to increase the temperature of the dispersants to improve the dispersibility.

In the simplest case, air is used as the carrier gas, but it is also possible to use nitrogen or another inert gas, for example a noble gas. On the other hand, particularly advantageous anchoring effects can also be achieved with reactive gases, such as, for example, with halogens, carbon dioxide, ammonia or formaldehyde, which may be mixed with inert gases.

In the process according to the invention, the structured coating can be applied to the substrate layer off-line after the substrate has been produced. This applies particularly when sheet-like substrate layers are to be coated. However, the structured coating can also be applied equally well in-line, during the process for the production of the substrate layer. It is known that, for example, biaxially oriented films of thermoplastics are produced by extrusion of a melt and subsequent biaxial orientation, followed by heat setting. In this procedure, the structured coating can be applied before, between or after the individual stretching steps which take place one after the other, or can be applied before or after the heat setting.

Because of the particular application process according to the invention, the structured coating has particularly good adhesion to the substrate surface. The layer thickness of the structured coating usually corresponds to a weight per unit area of substrate to be coated in the region of only 1 to 500 $mg/m^2$.

Suitable potential applications for the sheet-like structures according to the invention are all fields of use where good sliding properties are desirable. For example, the use of packaging films on high-speed packaging machines or films for technical applications, such as, for example, magnetic tape films or capacitor dielectrics or substrate films for reprographic or photographic applications.

Various polymer films were treated by means of an aerosol/corona apparatus corresponding to the attached Figure. The apparatus consists of a generator 5 and a corona discharge apparatus 11. The generator applies a high-frequency alternating current at high voltage to the discharge electrodes 4 of the corona discharge apparatus 11. The metal core 2 of a roller 10 having a circumferential polymeric coating 3 serves as the grounded counter-electrode. A self-supporting polymer web 1 is transported over the roller 10. A housing 6 encloses the electrodes 4 of the corona discharge apparatus 11 and is connected via a line 7 to an atomizing apparatus 8, in which an aqueous liquid is atomized to give a suspendible aerosol by means of a two-material atomizing nozzle or a piezoelectric ultrasonic system. A blower 9 is connected to the atomizing apparatus and conveys the carrier gas (air) for the aerosol through the atomizing apparatus into the corona discharge apparatus 11.

The Examples which follow are intended to give a clearer description of the invention and the reproducible advantages which can be achieved with the invention.

Experimental Conditions

Unless stated otherwise, the transport velocity of the self-supporting polymer films was 20 m/min. The corona power in each case was 1,000 W (corresponding to a setting of 5,500 V). The surface roughness was determined by measurements according to DIN 4768.

To form a substrate layer, a pigment-free polyester raw material having a saponification value of 810 was melted, formed into a film by means of a slot die and quenched on a cooled roller polished to a high gloss to give an amorphous film. The amorphous preliminary film was stretched longitudinally at 95° C. and then stretched in the transverse direction at 110° C. The stretching ratio per unit area being about 13. The resulting 15 micron thick film was then heat set at 210° C. (film temperature). The film was then coated using the apparatus described.

EXAMPLE 1

Figure 2:
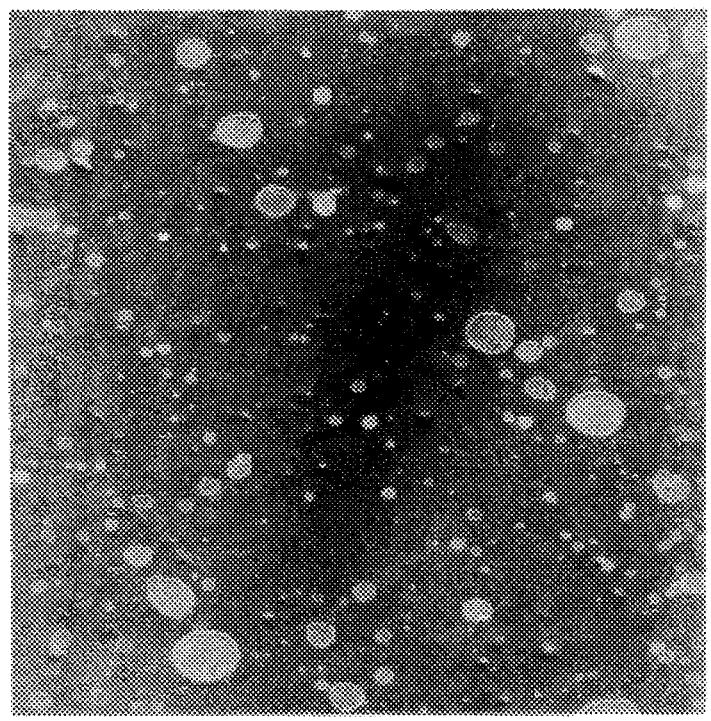
FIG. 2 is a photomicrograph at 300 times magnification of the film surface described in Example 1.
Figure 3:
FIG. 3 is a photomicrograph at 300 times magnification of the film surface described in Example 2.
Figure 4:
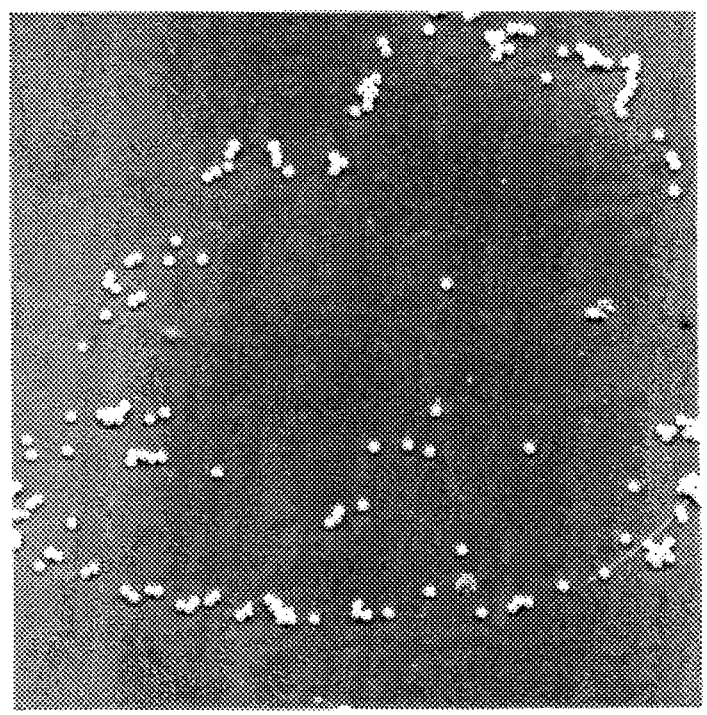
FIG. 4 is a photomicrograph at 3000 times magnification of the film surface described in Example 2.
Figure 5:
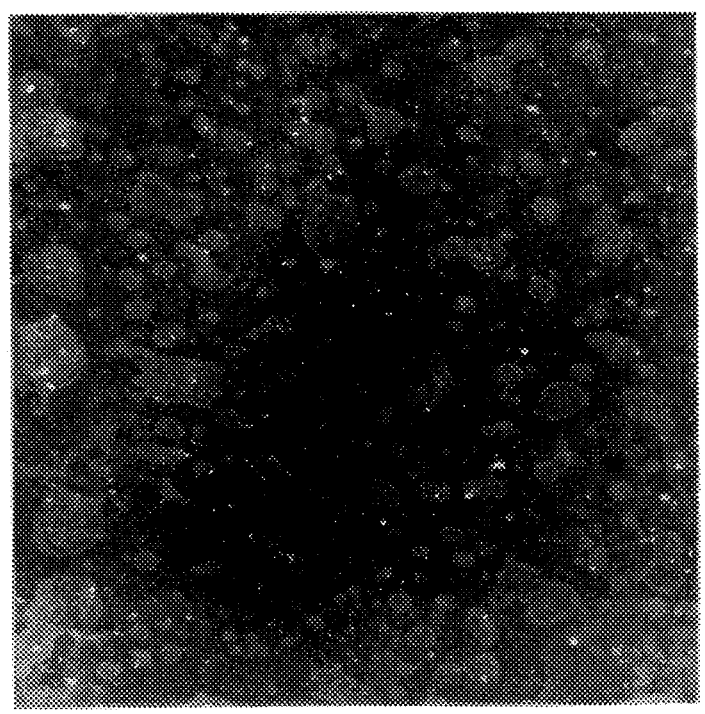
FIG. 5 is a photomicrograph at 300 times magnification of the film surface described in Example 3.
Figure 6:
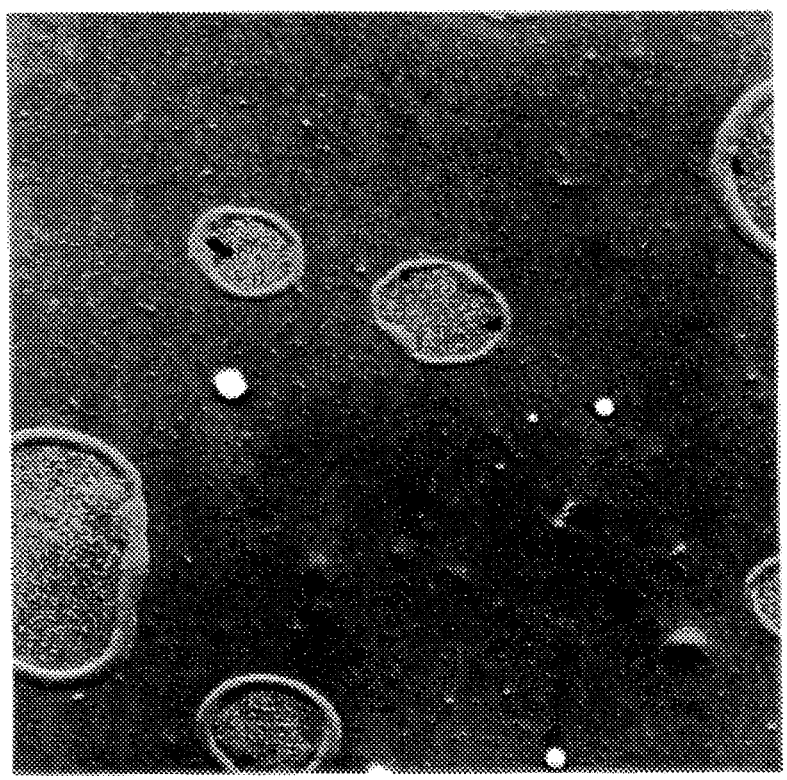
FIG. 6 is a photomicrograph at 3000 times magnification of the film surface described in Example 3.

The film was coated, during the corona discharge, with a 5 percent strength aqueous solution of a copolyester comprising 73 mole percent of terephthalic acid, 20 mole percent of adipic acid and 7 mole percent of Na salt of a sulfoisophthalic acid. The solution also containing 10 percent by weight, based on the solids content, of a colloidal $SiO_2$ having a mean particle size of 20 microns. FIG. 2 is a photograph which shows a scanning electron micrograph of the surface of the resulting film under 300 times magnification. This micrograph clearly shows how a texture has formed in which large and small, more or less circular structures are distributed in a purely random arrangement over the entire surface of the substrate layer, corresponding to impact with larger or smaller aerosol droplets. The coefficient of static and sliding friction (DIN 53,375) of the film was 33.

EXAMPLE 2

The film was coated, during the corona discharge, with a 4 percent strength dispersion of spherical, acrylate-containing polymer particles prepared by emulsion polymerization and having a mean diameter of 0.2 microns and a narrow distribution. The coating was applied at a rate of about 20 mg per square meter of substrate. FIGS. 3 and 4 are photographs which show scanning electron micrographs of the film surface at 300 and 3,000 times magnification. Only the outlines of a plurality of very irregular, annular structures are detectable in FIG. 3.

FIG. 4 shows the film surface at 3,000 times magnification. In this photograph, the individual polymer particles in the form of small spheres and their arrangement on the surface of the polyester film with respect to one another are now clearly recognizable. In this coating system, the majority of the inert particles evidently accumulate in the region of the edge zone of the film surface struck by an aerosol droplet. To improve the adhesion of the polymer particles to the substrate film, an aqueous copolyester-containing dispersion of the particles, having a solids content of 5 percent by weight, was applied. The concentration of the polymer particles was 10 percent by weight.

EXAMPLE 3

An aqueous copolyester-containing dispersion which contained 10 percent by weight of colloidal $SiO_2$ particles and 1 percent by weight of polymer particles, based in each case on the total solids content of the dispersion, was applied to the film during the corona discharge. The coating was applied at a rate of about 55 mg per square meter. FIGS. 5 and 6 are photographs which show scanning electron micrographs of the film surface at 300 and 3,000 times magnification. In FIG. 5, the polymer particles are not detectable, but at 3,000 times magnification it was evident that, in this coating system, the spheres were not arranged within that region of the film surface which was occupied by the silica. The coefficients of static and sliding friction of the film, determined according to DIN 53,375 were 35.

That which is claimed is:

1. A self-supporting sheet structure containing a substrate layer and a coating on at least one surface of the substrate layer, wherein said coating consists essentially of individual organic and/or inorganic inert particles, said organic and/or inorganic inert particles being deposited from an aerosol containing said organic and/or inorganic inert particles in discrete form dispersed in an aqueous solvent or dispersant, together with a carrier gas stream and being affixed directly on said surface of said substrate layer, forming a coating by means of an electric corona discharge which takes place in a corona discharge space between a high voltage electrode and a counter-electrode, the aerosol being simultaneously introduced into said space during said corona discharge.

2. A self supporting sheet structure as claimed in claim 1, wherein said substrate layer is a film of a thermoplastic biaxially oriented polyester film or a biaxially oriented polypropylene film.

3. A self supporting sheet structure as claimed in claim 1, wherein said corona discharge is operated at an alternating current voltage between 5,000 and 25,000 V.

4. A self supporting sheet structure as claimed in claim 1, wherein the transport velocity at which said substrate to be treated moves through said corona discharge is proportional to the level of the alternating current voltage at which said corona discharge is operated.

5. A self supporting sheet structure as claimed in claim 1, wherein said aerosol is produced using an atomizer selected from a two-material atomizing nozzle or a piezoelectric ultrasonic atomizing system.

6. A self supporting sheet structure as claimed in claim 1, wherein said coating has a thickness which corresponds to a weight per unit area in the region of 1 to 500 $mg/m^2$.

7. A self supporting sheet structure as claimed in claim 1, wherein said inorganic inert particles are silica particles.

8. A self-supporting sheet structure as claimed in claim 1 wherein the inert particles have a mean particle size in the range of 0.2 to 20 microns.

9. A self-supporting sheet structure as claim in claim 1 wherein the coating consists of organic and/or inorganic inert particles.

10. A self-supporting sheet structure as claimed in claim 9 wherein the coating consists of organic inert particles.

11. A self-supporting sheet structure containing a substrate layer and a coating on at least one surface of the substrate layer, wherein said coating consists essentially of individual organic and/or inorganic inert particles affixed to said substrate as a result of being deposited thereon from an aerosol containing discrete organic and/or inorganic inert particles dispersed in an aqueous solvent or dispersant together with a carrier gas stream, said aerosol being simultaneously introduced into a corona discharge space between a high voltage electrode and a counter-electrode during an electric corona discharge treatment of said surface which takes place in said space and which triggers reaction mechanisms which result in chemical surface modification of the substrate.

12. A self-supporting sheet structure as claimed in claim 11 wherein said corona discharge is operated at an alternating current voltage between 5,000 and 25,000 V.

13. A self-supporting sheet structure as claimed in claim 11 wherein the inert particles have a mean particle size in the range of 0.2 to 20 microns.

* * * * *